(12) United States Patent
Fei et al.

(10) Patent No.: US 11,494,615 B2
(45) Date of Patent: Nov. 8, 2022

(54) SYSTEMS AND METHODS FOR DEEP SKIP-GRAM NETWORK BASED TEXT CLASSIFICATION

(71) Applicant: Baidu USA, LLC, Sunnyvale, CA (US)

(72) Inventors: Hongliang Fei, Sunnyvale, CA (US); Chaochun Liu, San Jose, CA (US); Yaliang Li, Buffalo, NY (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 793 days.

(21) Appl. No.: 16/368,440

(22) Filed: Mar. 28, 2019

(65) Prior Publication Data
US 2020/0311519 A1 Oct. 1, 2020

(51) Int. Cl.
*G06N 3/04* (2006.01)
*G06K 9/62* (2022.01)
*G06F 17/18* (2006.01)

(52) U.S. Cl.
CPC .......... *G06N 3/0472* (2013.01); *G06F 17/18* (2013.01); *G06K 9/628* (2013.01); *G06N 3/0454* (2013.01)

(58) Field of Classification Search
CPC .... G06N 3/0472; G06N 3/0454; G06F 17/18; G06K 9/628
See application file for complete search history.

(56) References Cited

U.S. PATENT DOCUMENTS

| | | | |
|---|---|---|---|
| 8,892,488 B2 * | 11/2014 | Qi | G06F 40/30 706/45 |
| 10,372,815 B2 * | 8/2019 | Simard | G06F 16/951 |
| 10,445,356 B1 * | 10/2019 | Mugan | G06N 3/084 |
| 2012/0253792 A1 * | 10/2012 | Bespalov | G06F 16/353 704/9 |
| 2017/0286401 A1 * | 10/2017 | He | G06N 3/0454 |
| 2018/0268298 A1 * | 9/2018 | Johansen | G06F 40/30 |
| 2018/0357531 A1 * | 12/2018 | Giridhari | G06N 20/00 |

(Continued)

OTHER PUBLICATIONS

Deerwester et al., "Indexing by latent semantic analysis," Journal of the American society for information science, 1990. (34pgs).

(Continued)

*Primary Examiner* — Raymond L Nimox
(74) *Attorney, Agent, or Firm* — North Weber & Baugh LLP

(57) ABSTRACT

Described herein are embodiments for systems and methods to incorporate skip-gram convolution to extract non-consecutive local n-gram patterns for comprehensive information for varying text expressions. In one or more embodiments, one or more recurrent neural networks are employed to extract long-range features from localized level to sequential and global level via a chain-like architecture. Comprehensive experiments on large-scale datasets widely used for the text classification task were conducted to demonstrate the effectiveness of the presented deep skip-gram network embodiments. Performance evaluation on various datasets demonstrates that embodiments of the skip-gram network are powerful for general text classification task set. The skip-gram models are robust and may be generalized well on different datasets, even without tuning the hyper-parameters for specific dataset.

20 Claims, 9 Drawing Sheets

(56) References Cited

U.S. PATENT DOCUMENTS

2019/0087677 A1* 3/2019 Wolf .................... G06K 9/6271
2020/0042596 A1* 2/2020 Ravi ........................ G06N 3/04

OTHER PUBLICATIONS

Pang et al.,"Opinion mining and sentiment analysis," Foundations and trends in information retrieval, 2008. (94 pgs).
Ronan et al.,"Natural language processing (almost) from scratch," J. Mach. Learn. Res., vol. 12, pp. 2493-2537, 2011. (45 pgs).
Fan et al.,"Liblinear: A library for large linear classification," Journal of Machine Learning Research, 2008. (31 pgs).
J. Goodman, "Classes for fast maximum entropy training," arXiv preprint arXiv: cs.CL/0108006, 2001. (4pgs).
T. Joachims, "Text categorization with support vector machines: Learning with many relevant features," Springer, 1998. (7 pgs).
Cho et al.,"Learning Phrase Representations using RNN Encoder—Decoderfor Statistical Machine Translation," arXiv preprint arXiv:1406.1078, 2014. (15 pgs).
Hochreiter et al., "Long short-term memory," Neural computation, vol. 9, No. 8, pp. 1735-1780, 1997. (32pgs).
Hinton et al.,"Overview of mini-batch gradient descent," in Lecture on Neural Networks for Machine Learning, 2006. (31 pgs).
Hinton et al.,"Improving neural networks by preventingco-adaptation of feature detectors," arXiv preprint arXiv:1207.0580, 2012. (18pgs).
Santos et al.,"Deep convolutional neural networks for sentiment analysis of short texts," in Proc. of 25th Intr. Conf. on Computational Linguistics:Technical Papers, 2014.(10pg.
Zhang et al.,"Text understanding from scratch," arXiv preprint arXiv:1502.01710, 2016. (10 pgs).
Nguyen et al.,"Modeling skip-grams forevent detection with convolutional neural networks," in Proc.of the Conf. on Empirical Methods in Natural Language Processing, 2016.(6pg).
Lei et al.,"Molding CNNs for text:non-linear, non-consecutive convolutions," arXiv preprint arXiv:1508.04112, 2015. (11 pgs).
Jozefowicz et al.,"Exploring the limits of language modeling," arXiv preprint arXiv:1602.02410, 2016. (11 pgs).
Zhou et al.,"A C-LSTM Neural Network for Text Classification," arXiv preprint arXiv: 1511.08630, 2015. (10 pgs).
Lai et al.,"Recurrent convolutional neural networks for text classification," in Proc, of the AAAI Conference on Artificial Intelligence (AAAI), 2015. (7pgs).
Wang et al.,"Automatic Online News Issue Construction in Web Environment," In Proc. of the 17th Intr. Conf. on World Wide Web (WWW), 2008. (10pgs).
D. D. Lewis, "An evaluation of phrasal and clustered representationson a text categorization task," in Proc, of the intr. ACM SIGIR conf. on Research & development in Information retrieval, pp. 37-50, 1992. (14pgs).
G. Forman, "An extensive empirical study of feature selection metrics for text classification," Journal of machine learning research, vol. 3, pp. 1289-1305, 2003. (17pgs).
Rogati et al.,"High-performing feature selectionfor text classification," in Proc.of the11th intr. conf.on Information & knowledge management (CIKM), pp. 659-661, 2002.(3pgs).
J. Schmidhuber, "Deep learning in neural networks: An overview," arXiv preprint arXiv:1404.7828, 2014. (88pgs).
Liu et al.,"Unsupervised Document Embedding With CNNs," arXiv preprint arXiv: 1711.04168, 2018. (10pgs).
LeCun et al.,"Gradient ased Learning Applied to Document Recognition," Proceedings of the IEEE, vol. 86, No. 11, 1998. (46pgs).
Krizhevsky et al.,"ImageNet classification with deep convolutional neural networks," in Advances in neural information processing systems, 2012. (9 pgs).
Yin et al.,"Comparative study of cnn and rnn for natural language processing," arXiv preprint arXiv:1702.01923, 2017. (7 pgs).
Y. Kim, "Convolutional neural networks for sentence classification," arXiv preprint arXiv:1408.5882, 2014. (6 pgs).
Zhang et al., "Character-level convolutional networks for text classification," arXiv preprint arXiv:1509.01626, 2016. (9 pgs).
Mikolov et al.,"Distributed representations of words and phrases and their compositionality," arXiv preprint arXiv: 1310.4546, 2013. (9 pgs).
Xiao et al.,"Efficient character-level document classification by combining convolution and recurrent layers," arXiv preprint arXiv: 1602.00367, 2016. (10 pgs).
Conneau et al.,"Very deep convolutional networks for natural language processing," arXiv preprint arXiv:1 606.01781, 2017. (10 pgs).
Yogatama et al.,"Generative and Discriminative Text Classification with Recurrent Neural Networks," arXiv preprint arXiv:1703.01898, 2017. (9pgs).
C.C. Aggarwal "A survey of text classification algorithms," in Mining text data. Springer, pp. 163-222, 2012. (60pgs).
Breck et al.,"Opinion mining and sentiment analysis," in The Oxford Handbook of Computational Linguistics 2nd edition, 2017. (49pgs).
Büttcher et al.,Information retrieval: Implementing and evaluating search engines, The MIT Press, 2016. (13 pgs).
Kumar et al.,"Ask me anything: Dynamic memory networks for natural language processing," arXiv preprint arXiv:1506.07285, 2016. (10pgs).
Scott et al., "Feature engineering for text classification,"in Proc. of the International Conference on Machine Learning (ICML), vol. 99, 1999. (10pgs).

* cited by examiner

900

SYSTEMS AND METHODS FOR DEEP SKIP-GRAM NETWORK BASED TEXT CLASSIFICATION

BACKGROUND

A. Technical Field

The present disclosure relates generally to systems and methods for text classification. More particularly, the present disclosure relates to systems and methods for text classification using both long-range and local-pattern features.

B. Background

Text classification, which aims to assign pre-defined label(s) to texts, is one of the indispensable tasks for natural language processing. It has many potential applications, such as opinion mining and sentiment analysis, web search, information retrieval, ranking and document classification. Due to its importance, text classification has been studied for decades. Due to large varying of text expression, existing methods for text classification may not well capture long-range or abstract-level features within texts.

Accordingly, what is needed are systems and methods for text classification using both long-range and local-pattern features.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF EMBODIMENTS

Figure 1:
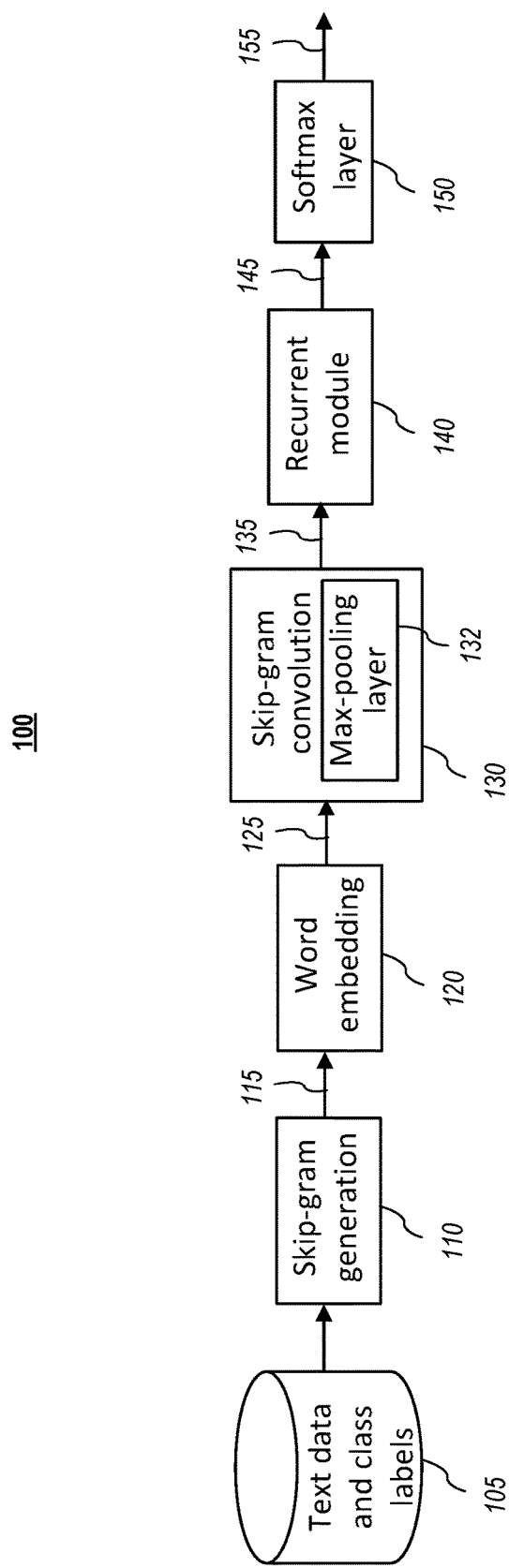
FIG. 1 depicts a block diagram for a deep skip-gram network model for text classification, according to embodiments of the present disclosure.

In the following description, for purposes of explanation, specific details are set forth in order to provide an understanding of the present disclosure. It will be apparent, however, to one skilled in the art that embodiments may be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the present disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. An image may be a still image or from a video.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Text classification, which aims to assign pre-defined label(s) to texts, is one of the indispensable tasks for natural language processing. It has many potential applications, such as opinion mining and sentiment analysis, web search, information retrieval, ranking and document classification. Due to its importance, text classification has been studied for decades.

Traditionally, many researchers focus on designing various features that are extracted from texts, such as bag-of-words, part-of-speech tags, noun phrases, and kernels. To distinguish the usefulness of different features, feature selection or feature engineering is largely explored. Several classification models, such as naive bayes and support vector machines, are performed on top of the extracted features. The drawback of such traditional methods is that the feature engineering procedure is time-consuming and it might not be applicable to large-scale text data.

Recent years have witnessed an increasing popularity to adopt deep neural networks to various domains, including computer vision and natural language processing, as such networks have strong ability to automatically learn useful features from raw data. Some studies apply both convolutional neural network (CNN) and recurrent neural network (RNN) to numerous natural language processing tasks, and the performance of these neural networks on text classification is promising. These trends encourage researchers to propose various neural network structures for text classification. Among these proposed structures, CNN-based models can extract local position-invariant features while RNN-based model can capture sequential features.

However, existing methods to text classification still cannot well capture long-range or abstract-level features within texts due to large varying of text expression. Motivated by this, this patent document discloses systems and methods to incorporate skip-gram convolution into neural networks. FIG. 1 depicts a block diagram for a deep skip-gram network 100 based text classification, according to one or more embodiments of the present disclosure. The disclosed deep skip-gram network comprises a skip generation module 110, a word embedding module 120, a skip-gram convolution module 130, a recurrent module 140, and a softmax layer 150. The skip generation module 110 generates a plurality of skip-gram sequences 115 with n-gram length from input text data 105. In one or more embodiments, the input text data 105 comprises one or more statements or sentences. The input text or input sentence comprises one or more words, and may or may not be a format of formal sentence. The input text data may be from a training text database with ground-truth labels. The plurality of skip-gram sequences comprise at least one sequence having non-consecutive words in the input text data. In one or more embodiments, the maximum distance (or skip size) between the non-consecutive words among the plurality of sequences are pre-defined as k, a number no greater than number n. The word embedding module 120 is configured to convert the plurality of skip-gram sequences into corresponding word vectors 125, with each word vector corresponding to a gram. In one or more embodiments, the word embedding module 120 may be configured to convert the whole text input to word vectors first, and then word vectors corresponding to the plurality of skip-gram sequences are combined accordingly. In one or more embodiments, the word embedding module 120 is a model embedding words into vectors with model parameters tunable during text classification training. Although word2vec model is used in some embodiments, other applicable models or methods for word embedding may also be used. The skip-gram convolution module 130 may be a convolutional neural network (CNN) to extract non-consecutive n-gram features of varying text expression, and effectively detects local-range features at different positions. In one or more embodiments, the skip-gram convolution module 130 comprises a max-pooling layer 132 implementing a max-overtime-pooling operation to reduce redundant feature and output selected features 135 among the extracted non-consecutive n-gram features. In one or more embodiments, the selected features correspond to the most important features at each position. These outputted selected features are used as input of recurrent module 140, which may comprises one or more recurrent neural networks, captures the long-range or abstract-level features via the chain-like architecture. Finally, one or more last hidden states 145 of the one or more recurrent neural networks are fed into the softmax layer 150, which generates one or more classification probabilities 155 for text classification into different categories, and/or for computing a loss function for updating model parameters of the deep skip-gram network. The classification probabilities may be used to calculate predictive loss for model training. In one or more embodiments, the skip-gram generation module and the skip-gram convolution module may be integrated together into a single skip-gram generation and convolution module. More details of each module and its operation are described in Section C.

In a short summary, some key contributions of the present document include:
- Two deep skip-gram network architecture embodiments are designed to create novel skip-gram convolutional features into neural networks.
- Skip-gram convolution operation is disclosed to comprehensively detect the local pattern of varying text expression.
- Comprehensive experiments were conducted on large-scale datasets that are used for the text classification task.

Various experiments show that embodiments of deep skip-gram networks outperform most of competing state-of-the-art methods, especially significant on more complex and challenging datasets. Moreover, the presented model embodiments are very robust and may be generalized very well on different datasets without tuning the hyper-parameters. Such experimental results demonstrate that the presented skip-gram net is powerful for general text classification task.

In the following sections, some related work is discussed in Section B, an overview of the deep skip-gram networks and details of each module are presented in Section C, tests of architecture embodiments on real-world datasets for text classification are disclosed in Section D, and finally some conclusions are described in Section E and system embodiment is described in Section F.

B. Some Related Work

Some related works in various aspects are summarized in this Section.

Text classification is one of the most important task in natural language procession (NLP), and it has many applications such as sentiment analysis, information retrieval, and question answering. Traditionally, various features, such as bag-of-words, noun phrases, are designed, and then various feature selection and machine learning methods are conducted for text classification task.

Recently, deep neural networks have demonstrated the strong ability to automatically learn features from data. Further, word embedding and text representation learning make deep neural networks more suitable for NLP tasks. Among them, convolutional neural network (CNN) and recurrent neural network (RNN) are widely adopted by various NLP tasks. For text classification task, some studies point out that CNN is good at extracting position-invariant features while RNN is good at modeling units in sequence.

Some have studied application of CNN to text classification task and the performance is promising. Deep CNN has been applied to extract information from texts at character-level rather than word level, and showed that ConvNet is effective for text classification. Some has applied much deeper convolutional nets with up to 29 layers to text processing. Some have explored skip-grams features extracted from texts and fed them into CNN for event detection, sentiment classification task. The skip-thought vectors are encoded for unsupervised sentence representation. Meanwhile, the generative RNN/LSTM models are also used for text classification. Also, some have demonstrated that character CNN and RNN can capture useful information in texts and improve the performance of language model. Moreover, there are some studies combining the CNN with RNN for the task. Some have combined CNN and RNN, and proposes a model C-LSTM, which can capture local features of phrases and temporal sentence semantic. Some has used a recurrent convolutional neural network (RCNN) to utilize the advantages of both CNN and RNN for text classification. Some has used network architecture with both convolution and recurrent layers to encode character inputs.

Compared to above existing work, this patent document discloses embodiments of deep skip-gram networks to combine the skip-gram convolution with RNN, which may generate skip-gram convolutional features to comprehensively capture local patterns of varying text expressions of human language.

C. Embodiments of Deep Skip-Gram Networks

In this section, embodiments of deep skip-gram networks for text classification are introduced. Two deep skip-gram network architecture embodiments and details of each architecture component or module are described below.

1. Embodiments of Deep Skip-Gram Network Architectures

Two deep skip-gram network architecture embodiments are disclosed, with components or modules of each embodiment described in the following descriptions.

Figure 2:
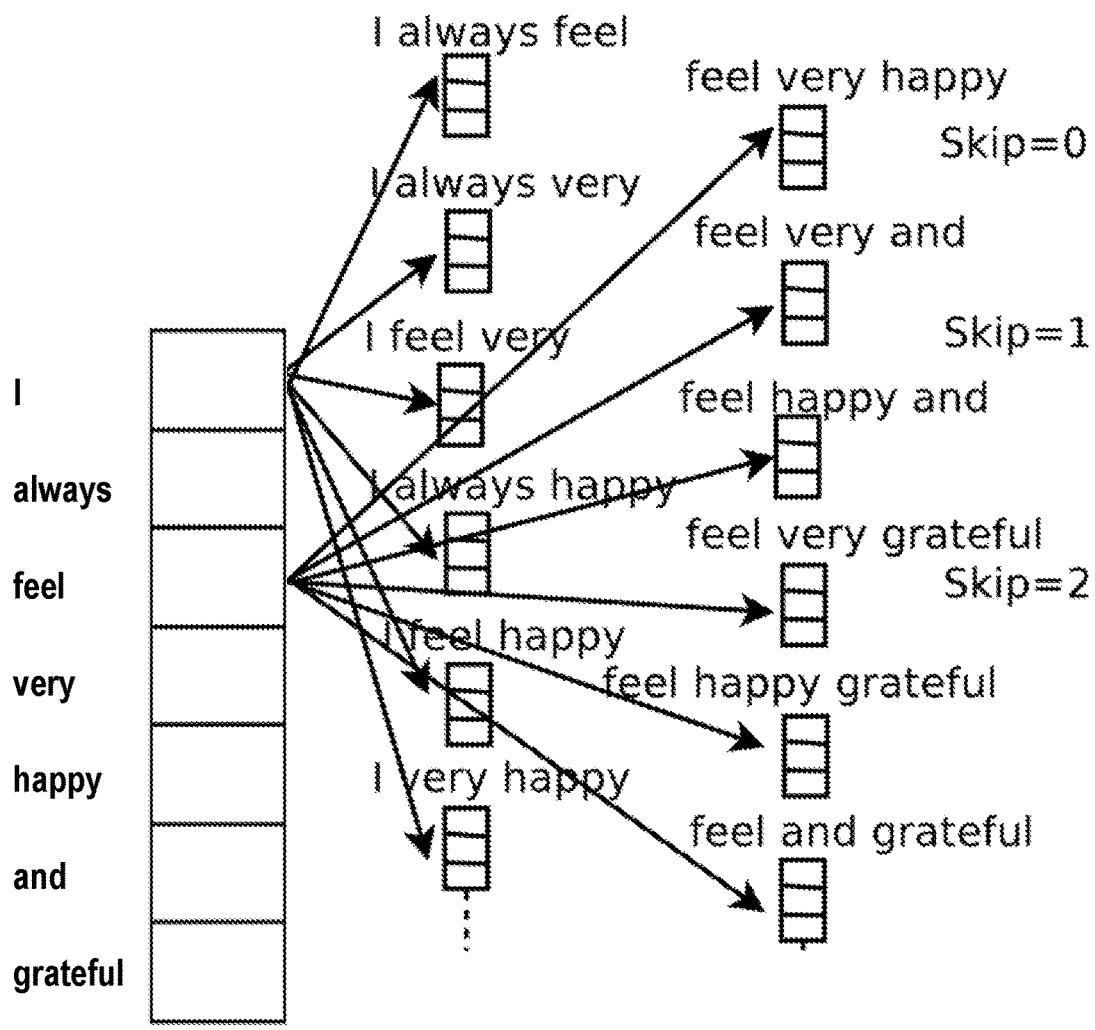
FIG. 2 graphically depicts an exemplary 2-skip-3-gram, according to embodiments of the present disclosure.
Figure 3:
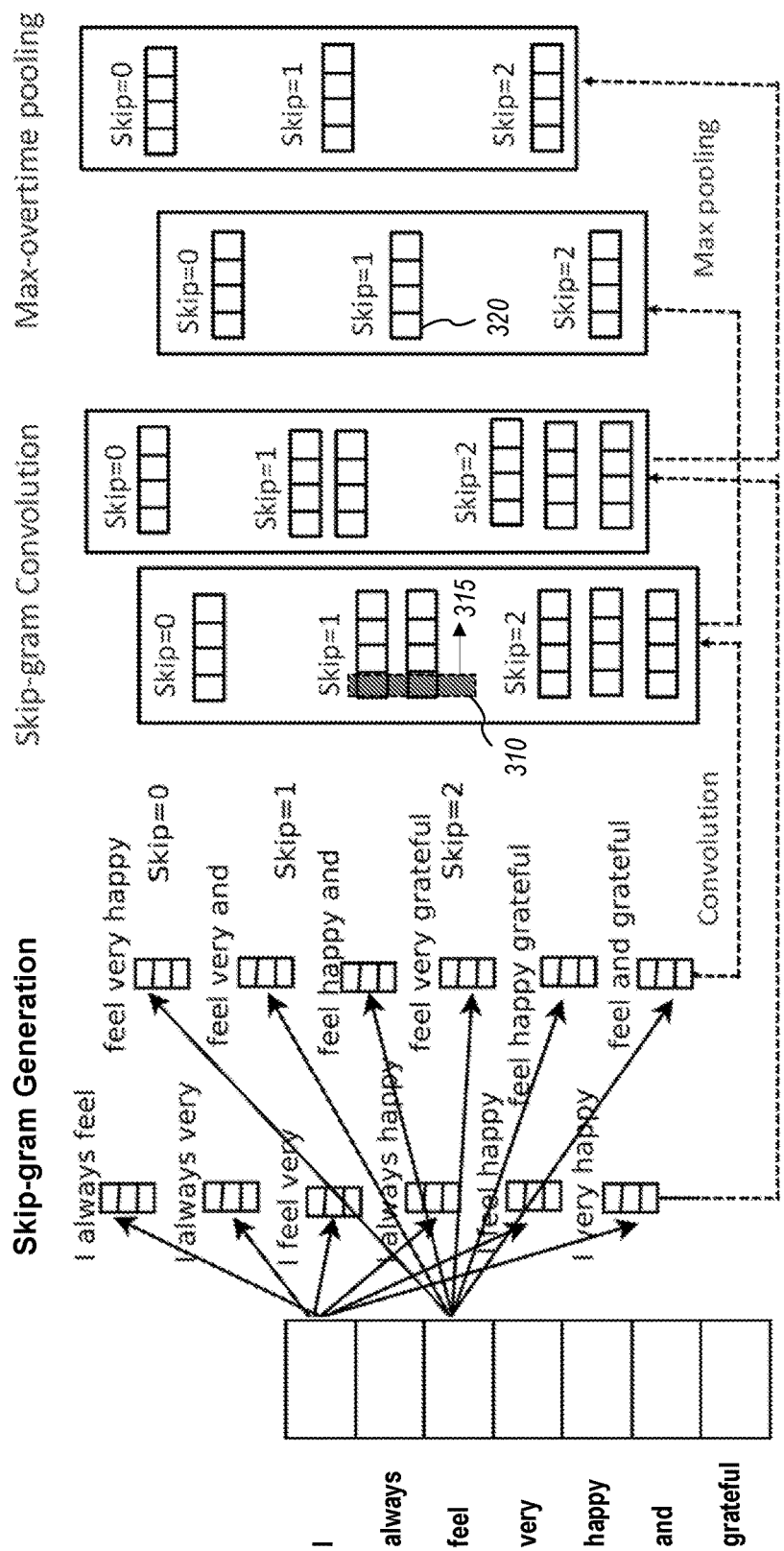
FIG. 3 graphically depicts a skip-gram convolution and a max-pooling layer, according to embodiments of the present disclosure.

Both architectures of the two deep skip-gram networks comprise two main components: a skip-gram generation and convolution module, and a recurrent module. Given raw text sequence, the skip-gram generation and convolution module is configured to generate non-consecutive n-gram sequences (as shown in FIG. 2), to extract non-consecutive n-gram features and to detect localized abstract features at different positions (as shown in FIG. 3), which provide more comprehensive and enriched text expression in syntax, help understand the varying text expression better. The max-overtime-pooling operations, as shown in FIG. 3 and also in FIG. 4, reduce the redundant features and output the most important abstract-level features. The recurrent module is used to capture long-term dependencies and global features over window feature of skip-gram convolutional sequences via a chain-like architecture. Finally, the hidden states of recurrent module are fed into a softmax layer, which classifies texts into different categories.

Figure 5:
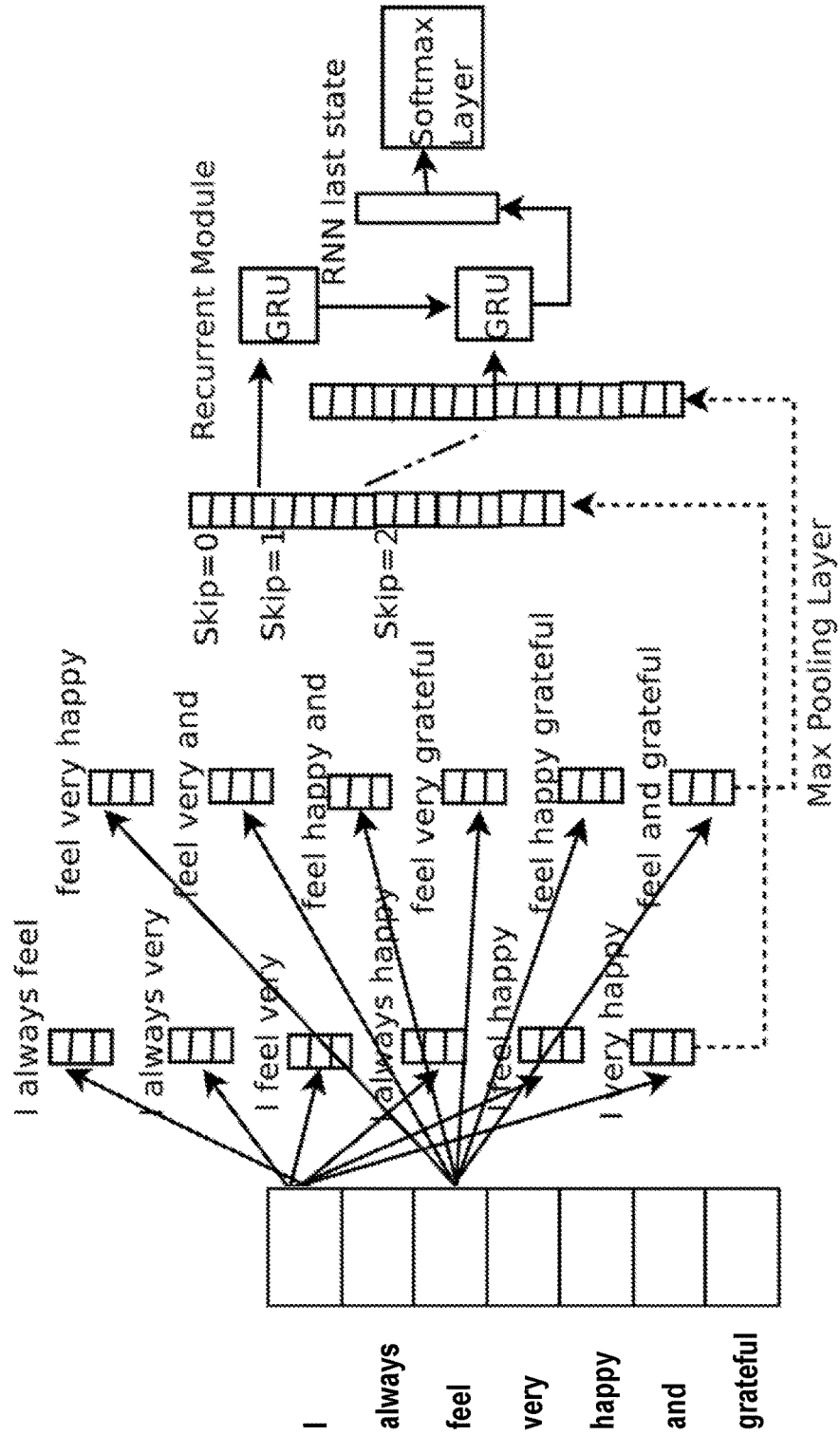
FIG. 5 depicts a deep skip-gram network architecture with a unique recurrent neural network (unique RNN) for all skip-gram convolutional, according to embodiments of the present disclosure.
Figure 6:
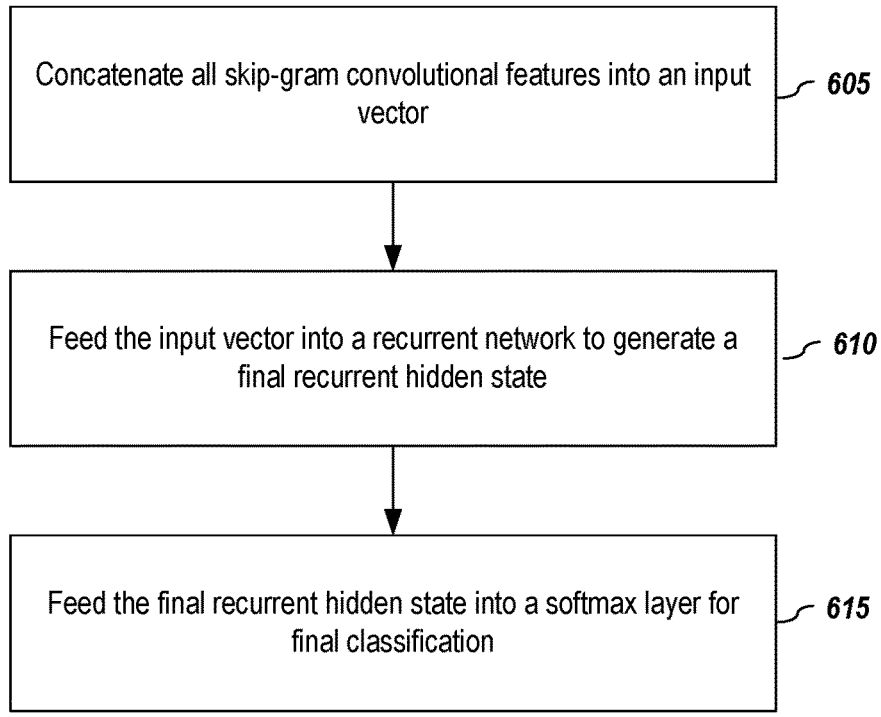
FIG. 6 depicts a method for text classification using deep skip-gram network with a unique-RNN, according to embodiments of the present disclosure.
Figure 7:
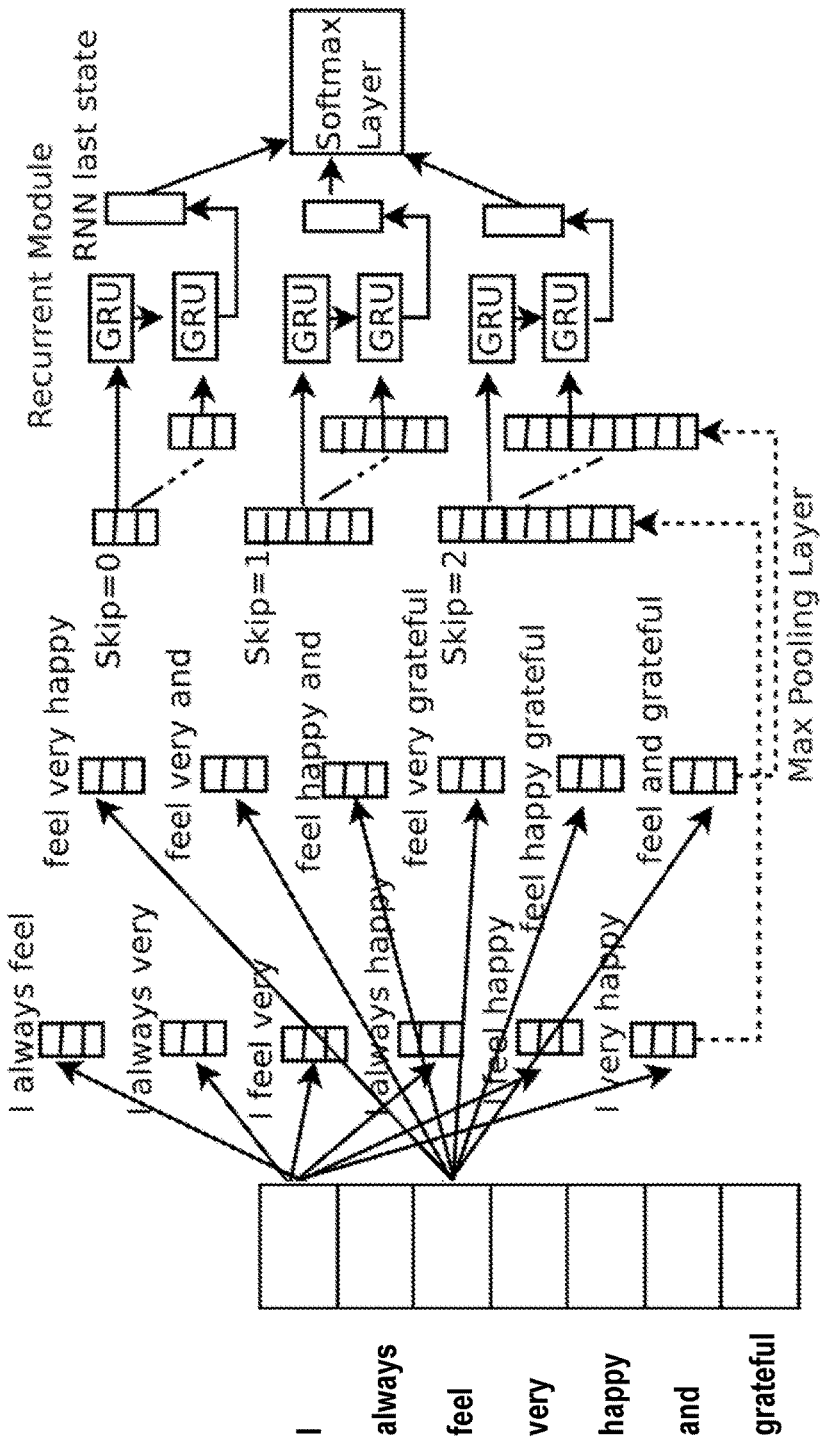
FIG. 7 depicts a deep skip-gram network architecture with multiple recurrent neural networks (multi-RNNs), respectively for each skip-gram convolutional output, according to embodiments of the present disclosure.
Figure 8:
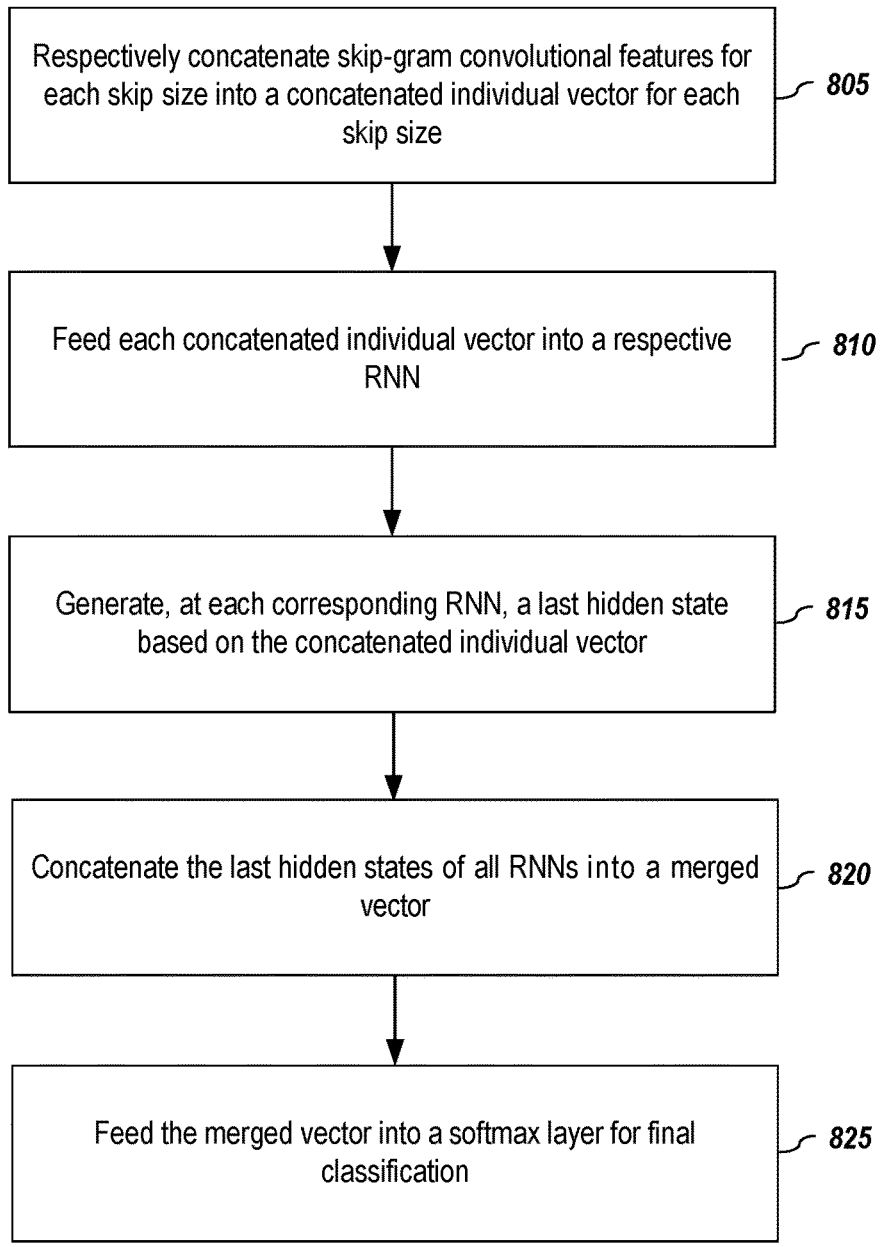
FIG. 8 depicts a method for text classification using deep skip-gram network with multi-RNNs, according to embodiments of the present disclosure.

In one or more embodiments, two different skip gram network architectures are disclosed. The main difference between the two network architecture embodiments is the recurrent module. A deep skip-gram network with a unique recurrent neural network (unique-RNN), as shown in FIG. 5 and FIG. 6, concatenates all the skip-gram convolutional features into a feature vector to feed the input of recurrent module, that is, all of the skip-gram information is included to train the unique recurrent network structure. A deep skip-gram network with multiple recurrent neural network (multi-RNN), as shown in FIG. 7 and FIG. 8, respectively concatenates the skip-gram convolutional features into a feature vector for individual skip size of 0, 1, or 2 words, then build the recurrent network separately for individual skip size and finally concatenate all the final state output of all recurrent modules as a merged vector for final classification. More detailed descriptions are given in the following sections.

2. Embodiments of Skip-Gram Convolution Module

Traditional convolutions only consider the sequential gram of text, and ignore the word skipping due to varying expression of human language. So, it cannot cover enough local patterns of varying text expression. In this patent document, embodiments of skip-gram convolution operation are disclosed to identify as much local pattern of human language as possible.

Skip-gram generation. Skip-gram is a generalization of n-grams. The words in skip-gram need not be consecutive in the text but may leave gaps that are skipped over for given skip size. It provides one way of overcoming the data sparsity problem found with conventional n-gram analysis. Formally, an n-gram is a consecutive subsequence of length n of some sequence of tokens $w_1, w_2, \ldots w_n$. A k-skip-n-gram is a length-n subsequence where the tokens occur at distance at most k from each other. FIG. 2 graphically depicts an exemplary 2-skip-3-gram, according to embodiments of the present disclosure. For example, in the input text comprising one or more words (e.g. a sentence) of FIG. 2—"I always feel very happy and grateful", the set of 2-skip-3-grams starting at the word "I" includes the 3-grams: "I always feel" (skip size=0), and in addition the subsequences: "I always very", "I feel very" (skip size=1), and "I always happy", "I feel happy", "I very happy" (skip size=2). It covers more comprehensive and possible phrases in syntax, such as "I feel very", "I feel happy", which are very common in varying text of human language. However, they cannot be identified by only using consecutive n-gram. Therefore, the skip-gram generation may provide much more comprehensive text expression in human language, and thus make contribution to text understanding, especially for the case of informal texts or typos.

In one or more embodiments, the generated skip-gram sequences are indexed or coded according to factors including start position of the skip-gram sequences in the input text, and/or total skip size of each skip-gram sequence, etc. In one or more embodiments, after generating the skip-gram for each token in text, the list of skip-gram convolutional channels of text sequence is constructed with different skip codes, which is defined as the string of word gaps in the skip-gram. For example, the skip code for the 0-skip-3-gram "I always feel" is "0-0", which means there is zero gap between the word "always" and "I", and between the word "feel" and "always". Similarly, the skip codes for 1-skip-3-gram "I always very", "I feel very" are "0-1", "1-0", where the sum of digits (gaps) in the code is 1 for skip size=1, and the skip codes for 3-gram "I always happy", "I feel happy", "I very happy" are "0-2", "1-1", "2-0", where the sum of digits (gaps) in the code is 2 for skip size=2. Table 1 illustrates the skip codes for 3,4,5-grams with skip size up to 2.

Given each skip code, skip-gram convolutional channel of text sequences may be constructed via skip-gram generation defined by the skip code. In this patent document, various skip-gram convolutional embodiments are explored. The embodiments include the skip-gram convolution with 3-4-5-grams and skip size up to 1, which has 12 channels, and the skip-gram convolution with 3-4-5-grams and skip size up to 2, which has 31 channels. However, it is not encouraged to use skip size bigger than 2 due to the constraint of human language. A big skip size may lead to lots of nonsense phrases not existing in human language. The noise phrases may seriously affect understanding of the varying text.

TABLE 1

Skip codes for 3, 4, 5-grams with skip size 0, 1, 2

| N-gram | skip size = 0 | skip size = 1 | skip size = 2 |
|---|---|---|---|
| 3-gram | "0-0" | "0-1" | "0-2" |
|  |  | "1-0" | "2-0" |
|  |  |  | "1-1" |
| 4-gram | "0-0-0" | "0-0-1" | "0-0-2" |
|  |  | "0-1-0" | "0-2-0" |
|  |  | "1-0-0" | "2-0-0" |
|  |  |  | "0-1-1" |
|  |  |  | "1-0-1" |
|  |  |  | "1-1-0" |
| 5-gram | "0-0-0-0" | "0-0-0-1" | "0-0-0-2" |
|  |  | "0-0-1-0" | "0-0-2-0" |
|  |  | "0-1-0-0" | "0-2-0-0" |
|  |  | "1-0-0-0" | "2-0-0-0" |
|  |  |  | "1-1-0-0" |
|  |  |  | "1-0-1-0" |
|  |  |  | "1-0-0-1" |
|  |  |  | "0-1-1-0" |
|  |  |  | "0-1-0-1" |
|  |  |  | "0-0-1-1" |

Figure 4:
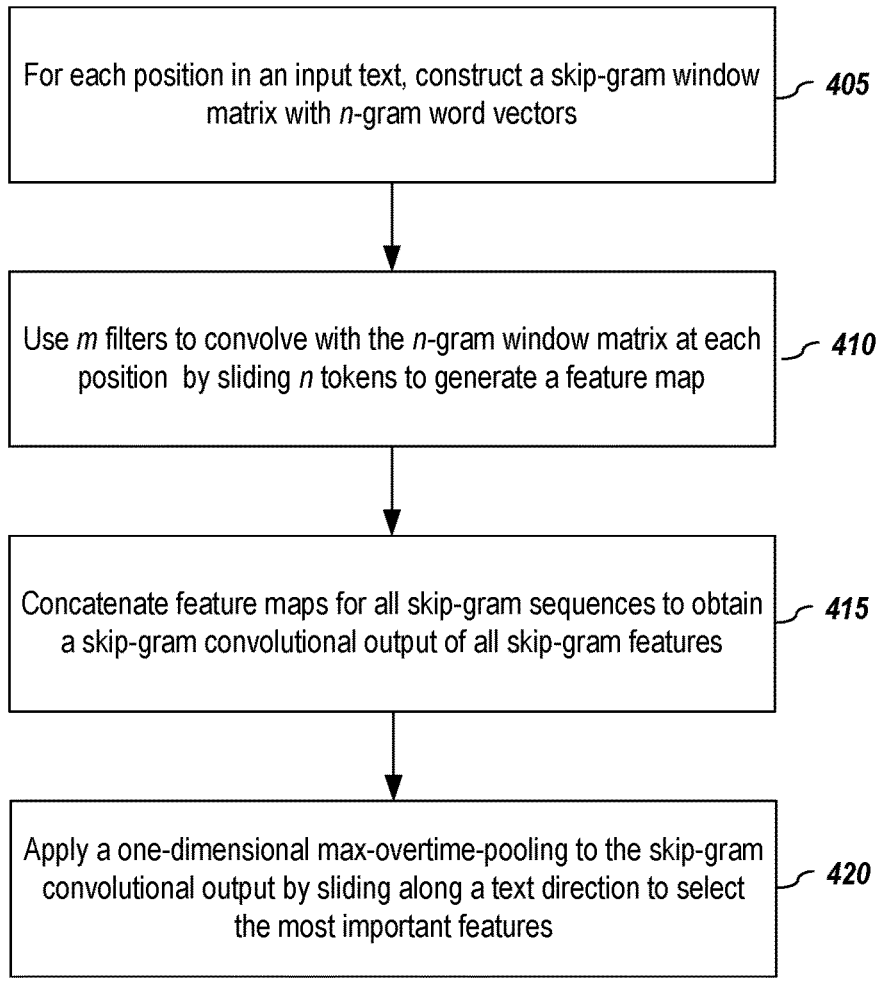
FIG. 4 depicts a method for skip-gram convolution and max-pooling, according to embodiments of the present disclosure.

Skip-gram Convolution and max-overtime-pooling operation. In one or more embodiments, for each skip-gram text sequence, skip-gram convolution and max-overtime-pooling operation are performed to detect localized abstract features at different positions. FIG. 3 graphically depicts a skip-gram convolution and a max-pooling layer, according to embodiments of the present disclosure. For each skip-gram text sequence, an individual feature map may be generated by the skip-gram convolution module. Similar to the skip-gram sequences, the individual skip-gram feature maps may be grouped based on start position and total skip size of corresponding skip-gram sequences. In one or more embodiments, one-dimensional max-overtime-pooling 310 is applied to the skip-gram convolutional output by sliding along the text direction to extract most important feature 320. FIG. 4 depicts a method for skip-gram convolution and max-pooling, according to embodiments of the present disclosure. Let $x_i \in R^d$ be the d-dimensional word vectors for the i-th word in a skip-gram sequence generated from the input sentence. Let $x \in R^{L \times d}$ denote the input sentence in word vector representation, where L is the length of the sentence, and d is the word vector size. In one or more embodiments, n is the gram size and also set as the filter size and the slide size. Suppose the matrix $E \in R^{n \times d}$ is a filter for the skip-gram convolution operation. In one or more embodiments, the matrix E relates to model parameters for the convolution module, and may be viewed as a weight matrix applied to each $w_p$. There are m such matrices in total corresponding to m filters. For each position p in the input text, a skip-gram window matrix $w_p$ may be constructed (405) comprising word vectors for n-gram $w_p=[x_p, x_{p+1}, \ldots x_{p+n-1}]$. m filters are used to convolve (410) with the n-gram window matrix at each position p=1, ..., L by sliding n tokens to generate a feature map $G=[G_1, G_2, \ldots, G_L] \in R^{L \times m}$ with each feature map $G_p$ at each position p given by $G_p=f(w_p \odot E_r)$, r=1, ..., m, where $\odot$ is skip-gram convolution operation, f is a nonlinear transformation function. In one or more embodiments, a Rectified Linear Units (ReLU) function is chosen as the nonlinear function. Finally, for each skip-gram text sequence, an individual feature map $G \in R^{L \times m}$ may be generated. Given n-gram and s-skip, supposing v is the number of skip-gram text sequences, by concatenating (415) the feature map $GM=[G^1, G^2, \ldots G^v] \in R^{L \times (m \times v)}$, the sequential output of all skip-gram convolutional features may be obtained. In one or more embodiments, a one-dimensional max-overtime-pooling is then applied (420) to the skip-gram convolutional output by sliding along the text direction to select the most important features. As shown in an example in FIG. 3, a one-dimensional max-overtime-pooling 310 is applied to each column of the skip-gram convolutional outputs corresponding to skip-gram sequences starting at "feel" and with skip size as 1. The max-overtime-pooling 310 slides along the text direction 315 to extract most important feature 320. Since there are lots of overlaps in the skip-gram text sequences, the max-overtime-pooling is able to reduce the redundancy and extract the most important abstract-level features. An illustration is shown in FIG. 5 for a deep skip-gram network with unique-RNN.

In one or more embodiments, suppose $v_0, v_1, \ldots, v_s$ is respectively the numbers of skip-gram text sequences of 0-skip, 1-skip, ..., s-skip. For each skip-gram text sequence, the feature map $GM=(G^1, G^2, \ldots G^{v_i}) \in R^{L \times (m \times v_i)}$ may be concatenated, then one dimensional max-overtime-pooling to the skip-gram convolutional output is separately implemented by sliding along the text direction to select the most important features. Finally, for each skip size, a sequence of skip-gram convolutional and pooling feature vectors may be obtained, as shown in FIG. 7 for the deep skip-gram network with multi-RNN.

3. Embodiments of Recurrent Module

Recurrent module is able to propagate sequential information via a chain-like neural network architecture. The sequential output from skip-gram convolution module is fed into the recurrent module, in which the current input $x_t$ and the previous output of hidden state $h_{t-1}$ at each time step are integrated into the network inference. However, standard RNNs cannot effectively capture long-term dependencies, so in one or more embodiments, gated recurrent units network (GRU), a variant of long short term memory network (LSTM), is used to learn the long-term dependencies. At each time step, the output of the GRU is controlled by two gates, a reset gate r, and an update gate z, as shown in the equation below:

$$z = \sigma(x_t U^z + s_{t-1} W^z) \qquad (1)$$

$$r = \sigma(x_t U^r + s_{t-1} W^r) \qquad (2)$$

$$h = \tan h(x_t U^h + (s_{t-1} \odot r) W^h) \qquad (3)$$

$$s_t = (1-z) \odot h + z \odot s_{t-1} \qquad (4)$$

where $x_t$ is the current input, $s_{t-1}$ is the previous hidden state, a are activation functions and commonly instantiated with sigmoid function, $\odot$ denotes the element-wise multiplication. Intuitively, the reset gate determines how to combine the current input with the previous memory, and the update gate defines how much of the previous memory to keep. The gating mechanism is a great idea to learn long-term dependencies.

FIG. 5 depicts a deep skip-gram network architecture with a unique recurrent neural network (unique RNN) for all skip-gram convolutional, according to embodiments of the present disclosure. FIG. 6 depicts a method for text classification using deep skip-gram network with the unique-RNN as shown in FIG. 5, according to embodiments of the present disclosure. All the skip-gram convolutional features are concatenated (605) into an input vector, which is fed (610) into one unique recurrent network to generate a final recurrent hidden state. Output of the final recurrent hidden state is fed (615) into a softmax layer for final classification. FIG. 7 depicts a deep skip-gram network architecture with multiple recurrent neural networks (multi-RNN), according to embodiments of the present disclosure. FIG. 8 depicts a method for text classification using deep skip-gram network with the multi-RNN as shown in FIG. 7, according to embodiments of the present disclosure. Skip-gram convolutional features for each skip size are respectively concatenated (805) into a concatenated individual vector for each skip size. The concatenated individual vectors are fed (810) into respective RNNs. Each corresponding RNN generates (815) a hidden state based on the concatenated individual vector, the hidden state is the last or final hidden state of each corresponding RNN. In one or more embodiments, the multiple RNNs are independent from each other and do not share model parameters. The last hidden states of all RNNs are concatenated (820) into a merged vector, which is then fed (825) into a softmax layer for final text classification. In one or more embodiments, the classification probabilities may be used to assign a classification/category for a text input using the classification probabilities, such as, for example, by using a threshold value or by selecting the class associated with the highest probability.

4. Embodiments of Loss Function and Regularization

In one or more embodiments, for classification, the cross entropy loss function is used to train the deep skip-gram networks. Given the training samples $t_1, t_2, \ldots, t_N$ and its ground-truth label $y_1, y_2, \ldots, y_N$, each label is in the set $\{1, 2, \ldots, C\}$ where C is the number of class labels. Suppose for sample $t_i$, the estimated probabilities are $p_i^c \in [0, 1]$ for each label $c \in \{1, 2, \ldots C\}$. The training error is defined as:

$$CE - \text{Loss} = \sum_{i=1}^{N} \sum_{c=1}^{C} 1\{y_i = = c\} \log(p_i^c) \quad (5)$$

where $1\{\cdot\}$ is an indicator function. In one or more embodiments, the stochastic gradient descent with optimizer RMSProp is used to learn the model parameters, which is very effective for recurrent neural network inference.

In one or more embodiments, for regularization, two commonly used techniques are adopted: dropout and L2 weight regularization. Dropout is applied to the recurrent module and the final input vector for softmax layer to prevent over-fitting. The L2 regularization is also applied to the weight of the softmax layer in loss function.

D. Some Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, performance of embodiment of deep skip-gram networks are compared to state-of-the-art models on large-scale datasets to test the effectiveness of the presented model embodiments.

1. Embodiments of Datasets

In one or more embodiments, large-scale datasets ranging from hundreds of thousands to several millions of samples are downloaded. Most of them are highly complex and challenging for text classification. In one or more embodiments, some of the training and testing sets as described in Zhang et al. (Character-level convolutional networks for text classification, in *Advances in neural information processing systems*, 2015, pp. 649-657) were used. A brief description of the datasets is given below and the details may be found in Zhang et al.

DBPedia ontology dataset. The dataset contains 14 non-overlapping classes from DBpedia 2014 from Wikipedia, and the fields used are title and abstract of each Wikipedia article. For each class, there are 40,000 training samples and 5,000 testing samples.

Amazon reviews. The dataset contains 34,686,770 reviews from 6,643,669 users on 2,441,053 products from the Stanford Network Analysis Project. Two datasets are constructed using review title and review content. The full dataset contains 600,000 training samples and 130,000 testing samples with full scores in each class. The polarity dataset contains 1,800,000 training samples and 200,000 testing samples in each polarity sentiment.

The statistics of the large-scale datasets are summarized in Table 2

TABLE 2

Statistics of large-scale datasets*.

| Dataset | Classes | Training Samples | Testing Samples |
|---|---|---|---|
| DBPedia | 14 | 560,000 | 70,000 |
| Amazon Review Full | 5 | 3,000,000 | 650,000 |
| Amazon Review Polarity | 2 | 3,600,000 | 400,000 |

*Zhang et al., "Character-level convolutional networks for text classification," in *Advances in neural information processing systems*, 2015, pp. 649-657.

2. Embodiments of Padding and Word Embedding

Padding. For each batch in stochastic gradient descent (SGD), the maximum length of the text sequences in the batch is computed as batch_max_len, then set the max_len=min(batch max_len, truncated_max_len), where truncated_max_len=300 is a pre-defined parameter to truncate the sentences for GPU memory and speed consideration. In one or more embodiments, each sentence having a length less than max_len is padded with a special symbol indicating unknown word at the end, and long sentences longer than max_len are truncated by the first max_len word.

Word Embedding. In one or more embodiments, gensims package is employed to run the word2vec program (Mikolov et al., Distributed representations of words and phrases and their compositionality, in NIPS, 2013, pp. 3111-3119) on the corpus including the aforementioned datasets in lower case, with the parameter settings: min_count=5, sg=1, size=200, window=5. Finally, 200-dimensional word2vec representations are obtained for 622,081 words. In one or more embodiments, the word representation for the unknown words is initialized with 200-dimensional zeros vector. The word vectors are then tuned along with other model parameters during training.

3. Experiment Settings

In one or more experimental settings, only one skip-gram convolutional layer, one-max-overtime-pooling layer, one recurrent layer and one fully-connected softmax layer are used. For skip-gram sequence generation, the gram size is set to 3-4-5 combination and the model performance is investigated by setting skip size to 1, 2 respectively. For convolution operation, the filter number is set to 32, filter size and stride size are set to be equal to corresponding gram size for skip-gram sequences. For max-overtime-pooling operation, the pooling size is set to 3 and stride size is set to 1. For the recurrent layer, the hidden memory unit is set to 300 for deep skip-gram network with unique-RNN and as 200 for deep skip-gram network with multi-RNNs. For regularization, the dropout rate is set to 0.5, L2 regularization factor is set to 0.01. For model training, the batch size is set to 96, learning rate for RMSProp is set to 0.001 and decay rate is set to 0.9. The weights are initialized using a truncated normal distribution with mean 0 and standard deviation 0.1. In one or more embodiments, 5% samples are held out from the training dataset as the model validation set, and the model is trained using the remaining data. In one or more embodiments, the hyper-parameters are totally the same setting for all datasets. It should be emphasized that the parameters were not fine-tuned for different datasets, in order to validate the generalized effectiveness of Skip-gram model embodiments on different datasets.

4. Comparison Methods

To offer fair comparisons to competitive models, some of the datasets and evaluation protocol of Zhang et al. ("Character-level convolutional networks for text classification," in *Advances in neural information processing systems*, 2015, pp. 649-657) were employed. Skip-gram model embodiments are compared to the state-of-the-art methods in previous works, including both traditional and deep learning methods. The traditional methods include Bag-of-words (BOW), and its TFIDF (BOW-TFIDF), Bag-of-ngrams (ngrams), and its TFIDF (ngrams-TFIDF), which were reported in Zhang et al. The state-of-the-art deep learning methods include the character-level convolutional model (char-CNN) of Zhang et al., the character-based convolution recurrent network (char-CRNN) (Y. Xiao and K. Cho, Efficient character-level document classification by combining convolution and recurrent layers, CoRR, vol. abs/1602.00367, 2016), the very deep convolutional network (VDCNN) (A. Conneau, H. Schwenk, L. Barrault, and Y. LeCun, Very deep convolutional networks for natural language processing, CoRR, vol. abs/1606.01781, 2016), and the discriminative and generative LSTM models (Gen-LSTM) (D. Yogatama, C. Dyer, W. Ling, and P. Blunsom, Generative and Discriminative Text Classification with Recurrent Neural Networks, arXiv, 2017).

5. Some Results and Analysis

Performance comparison. Experimental results of deep skip-gram network embodiments with gram sizes 3-4-5 are presented the in Table 3, comparing to four traditional methods and four state-of-the-art deep learning methods. The results include the testing errors on large-scale datasets for the deep skip-gram network with unique RNN (FIG. 5), and the deep skip-gram net with multi-RNN (FIG. 7). Performances of different skip sizes 1 and 2 for each architecture are investigated. For each deep skip-gram network structure, the hyper-parameters are in the same setting for all datasets, the parameters were not fine-tuned for the validation of the generalized effectiveness of skip-gram model embodiments on different datasets. For char-CNN without data augmentation, char-CRNN, VDCNN and Gen-LSTM, the best reported result achieved by the different optimal parameters and optimal network structures are shown in their studies. The best results among all the methods are labeled in black font with underline and the second-best results are labeled in Italic font with underline.

TABLE 3

Testing error comparison on datasets*.

| Model | DBP. | Amz. F. | Amz. P. |
|---|---|---|---|
| BoW | 3.4 | 45.4 | 9.6 |
| BoW-TFIDF | 2.6 | 44.7 | 9.0 |
| ngrams | 1.4 | 45.7 | 8.0 |
| ngrams-TFIDF | 1.3 | 47.6 | 8.5 |
| char-CNN | 1.7 | 40.5 | 5.5 |
| char-CRNN | 1.4 | 40.8 | 5.9 |
| VDCNN | 1.3 | <u>37.0</u> | <u>4.3</u> |
| Gen-LSTM | 4.6 | — | — |
| Skip-gram Net uR s1 | *1.2* | 39.1 | 4.9 |
| Skip-gram Net uR s2 | *1.2* | 39.9 | 5.0 |
| Skip-gram Net mR s1 | *1.2* | 38.5 | *4.7* |
| Skip-gram Net mR s2 | 1.1 | *38.4* | *4.7* |

*Deep skip-gram network embodiments are with gram sizes 3-4-5. Numbers are in percentage. "uR stands for "unique RNN and "mR stands for "multi-RNN. The s1 are s2 respectively stand for skip size 1, 2. The hyper-parameters are in the same setting for all datasets.

It is observed that a skip-gram network embodiment is the best for a dataset and the skip-gram network embodiments are also the second best on all the depicted datasets. Considering the overall performance of these competing methods, the presented deep skip-gram method outperforms competing methods—BOW, BOW-TFIDF, ngrams, ngrams-TFIDF, char-CNN, char-CRNN, Gen-LSTM on the DBPedia, Amazon Review Full, and Amazon Review Polarity datasets, especially significant on much more complex and challenging datasets, such as 2.1% error decrease on Amazon Review Full. The deep skip-gram network model embodiments are still comparable with deep learning methods—char-CNN, char-CRNN, Gen-LSTM. Among all the competing models, the VDCNN model is a very deep network with 29 convolutional layers. Deep skip-gram network model embodiments even beat the VDCNN model on the DBpeida dataset, which shows the effectiveness of the deep skip-gram method. It is worth to emphasize again that the proposed methods used the same hyper-parameters for all datasets without specific tuning to show its robustness. However, the performance of char-CNN, char-CRNN, VDCNN and Gen-LSTM showed here is the best reported result achieved by the different optimal parameters and optimal network structures in their studies. It proves that the presented deep skip-gram network may identify more comprehensive, powerful features and has very good generalization for text classification on different datasets with varying text expressions.

By comparing the results of two deep skip-gram network embodiments, it is observed that deep skip-gram network with multi-RNN marginally outperforms deep skip-gram network with unique-RNN, which may due to more complex architecture. It is also observed that the deep skip-gram network with skip=1 has very close performance as that with skip=2. The larger skip size (e.g., skip size=2) does not improve the performance, which may be due to more noises of nonsense phrases induced by large skip size.

Robustness for gram sizes. Experiments are also conducted to test the robustness of deep skip-gram network embodiments with difference gram sizes on large-scale datasets. The gram sizes are respectively set to 3, 4, 5 individually and the filter size and stride size are set to be equal to corresponding gram size. Their results are compared to aforementioned gram size setting: 3-4-5 combination. Table 4 depicts the performance results for deep skip-gram networks with unique RNN, whereas Table 5 depicts the performance results for deep skip-gram networks with multiple RNNs. The best results for different gram-size settings are labeled in black font with underline. The results show that deep skip-gram network embodiments with individual gram sizes-3, 4, 5 have very close performance, and only very marginally under-perform the deep skip-gram networks with gram 3-4-5 combination across tested datasets. It concludes that the presented deep skip-gram networks are very robust to gram sizes. In case of speed priority, the deep skip-gram networks with individual gram should also achieve satisfied performance.

TABLE 4

Testing errors of deep skip-gram network embodiments with different gram sizes 3, 4, 5 and their combination. Numbers are in percentage. "uR" stands for "unique RNN. The s1 are s2 respectively stand for skip size 1, 2. The g3, g4, g5, g3-4-5 respectively stand for gram size = 3, 4, 5 and their combination. The best results for different gram-size settings are labeled in black font with underline.

| Model | DBP. | Amz. F. | Amz. P. |
|---|---|---|---|
| Skip-gram Net uR s1 g3 | 1.2 | 38.9 | 5.0 |
| Skip-gram Net uR s1 g4 | 1.2 | 38.9 | 4.9 |
| Skip-gram Net uR s1 g5 | 1.2 | 38.9 | 5.0 |
| Skip-gram Net uR s1 g3-4-5 | 1.2 | 39.1 | 4.9 |
| Skip-gram Net uR s2 g3 | 1.2 | 38.8 | 5.0 |
| Skip-gram Net uR s2 g4 | 1.2 | 39.0 | 5.0 |
| Skip-gram Net uR s2 g5 | 1.2 | 39.2 | 4.9 |
| Skip-gram Net uR s2 g3-4-5 | 1.2 | 39.9 | 5.0 |

TABLE 5

Testing errors of deep skip-gram network embodiments. Numbers are in percentage. "mR" stands for "multi-RNN. The s1 are s2 respectively stand for skip size 1, 2. The g3, g4, g5, g3-4-5 respectively stand for gram size = 3, 4, 5 and their combination. The best results for different gram-size settings are labeled in black font with underline.

| Model | DBP. | Amz. F. | Amz. P. |
|---|---|---|---|
| Skip-gram Net mR s1 g3 | 1.2 | 38.6 | 4.9 |
| Skip-gram Net mR s1 g4 | 1.2 | 38.7 | 4.8 |
| Skip-gram Net mR s1 g5 | 1.2 | 38.6 | 4.7 |
| Skip-gram Net mR s1 g3-4-5 | 1.2 | 38.5 | 4.7 |
| Skip-gram Net mR s2 g3 | 1.1 | 38.5 | 4.8 |
| Skip-gram Net mR s2 g4 | 1.2 | 38.5 | 4.7 |
| Skip-gram Net mR s2 g5 | 1.2 | 38.7 | 4.8 |
| Skip-gram Net mR s2 g3-4-5 | 1.1 | 38.4 | 4.7 |

Computational complexity. Embodiments of the skip-gram network model use the skip-gram convolution to capture comprehensive local phrases whose length usually varies from 2 to 7 words in human language, rather than sentence of long dependency, so skip=1 or skip=2 with gram size 3, 4, 5 may work well for text classification task. Experimental results show that the performance of skip=1 is comparable with skip=2. So, to reduce the computational cost, it is recommended to use skip=1. Although the complexity of 1-skip-n-gram convolution is n (=3, 4, 5) times of traditional convolution, the tested one or more skip-gram network embodiments have one skip-gram convolution layer, one max-overtime-pooling layer, one recurrent layer, and one softmax layer. The numbers of layers and parameters are comparable with char-CRNN, and much less than those of char-CNN and VDCNN which have 9 or 29 layers, which is very time-consuming. In general, the presented skip-gram network is very effective for text classification with low computational cost.

E. Some Conclusions

In this patent document, embodiments of a novel, unified framework of deep skip-gram networks are disclosed and two network architecture embodiments for text classification are discussed. Both architecture embodiments comprise two main components: a skip-gram convolution module and a recurrent module. The skip-gram convolution module extracts non-consecutive n-gram text, and detects localized abstract feature at different positions, which provide much more comprehensive local pattern for varying text expressions, and help understand the human text better, especially for informal texts or typos. The max-overtime-pooling operations reduce the redundant feature and output most important abstract-level features. These features are then fed into a unique recurrent network or multiple recurrent networks to captures long-term dependencies and global information via the chain-like architecture.

Extensive experiments have been conducted on large-scale datasets to demonstrate the effectiveness of the presented deep skip-gram networks. Experimental results show deep skip-gram network embodiments may outperform most of the cited competing state-of-the-art methods, especially on more complex and challenging datasets. Furthermore, performance of deep skip-gram network embodiments is also comparable to VDCNN with much fewer layers, fewer parameters, and less computational costs. The deep-skip gram network model embodiments are very robust and may be generalized very well on different datasets, even without tuning the hyper-parameters for specific dataset. Since the tuning of hyper-parameters is very tricky and timing-consuming, the robustness against hyper-parameters provides extra benefits to the presented deep skip-gram networks.

Embodiments of deep skip-gram network may be applied for a broader range of language processing tasks especially when more comprehensive and robust text representations are needed.

F. System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 9:
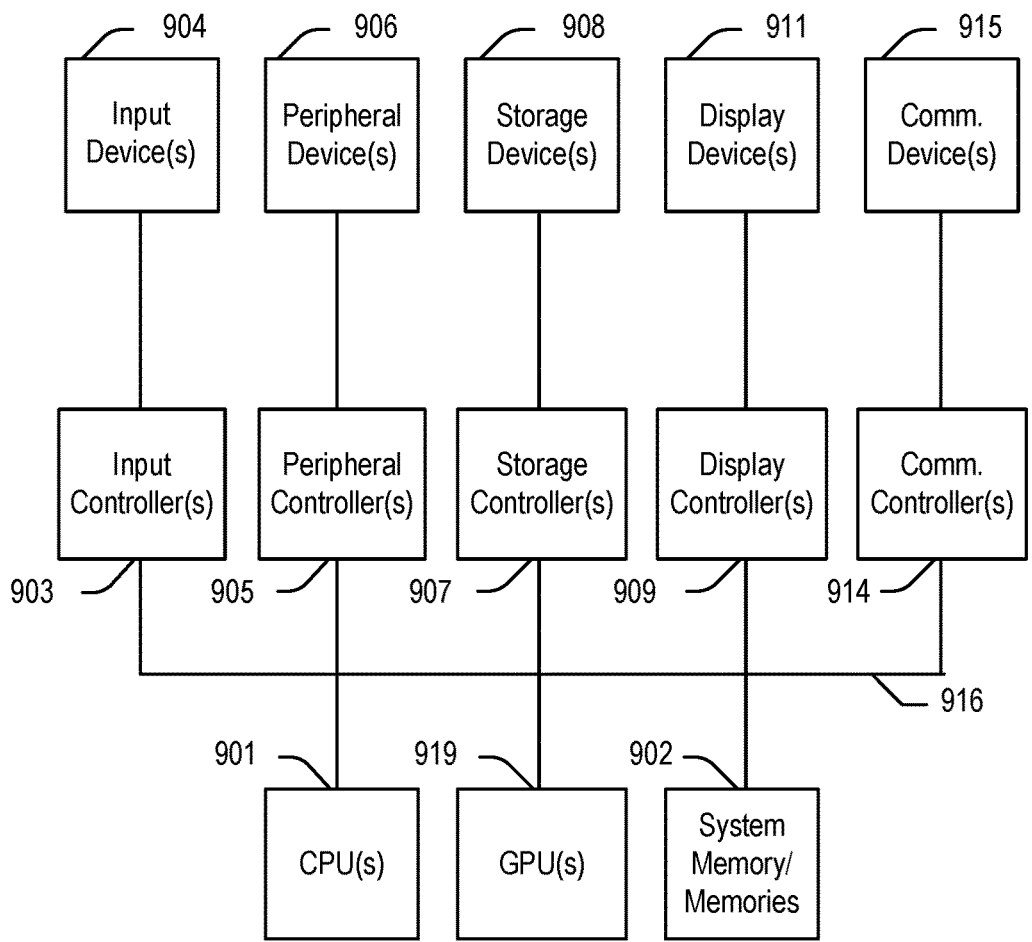
FIG. 9 depicts a simplified block diagram of a computing device/information handling system, in accordance with embodiments of the present document.

FIG. 9 depicts a simplified block diagram of a computing device/information handling system (or computing system) according to embodiments of the present disclosure. It will be understood that the functionalities shown for system 900 may operate to support various embodiments of a computing system—although it shall be understood that a computing system may be differently configured and include different components, including having fewer or more components as depicted in FIG. 9.

As illustrated in FIG. 9, the computing system 900 includes one or more central processing units (CPU) 901 that provides computing resources and controls the computer. CPU 901 may be implemented with a microprocessor or the like, and may also include one or more graphics processing units (GPU) 919 and/or a floating-point coprocessor for mathematical computations. System 900 may also include a system memory 902, which may be in the form of random-access memory (RAM), read-only memory (ROM), or both.

A number of controllers and peripheral devices may also be provided, as shown in FIG. 9. An input controller 903 represents an interface to various input device(s) 904, such as a keyboard, mouse, touchscreen, and/or stylus. The computing system 900 may also include a storage controller 907 for interfacing with one or more storage devices 908 each of which includes a storage medium such as magnetic tape or disk, or an optical medium that might be used to record programs of instructions for operating systems, utilities, and applications, which may include embodiments of programs that implement various aspects of the present invention. Storage device(s) 908 may also be used to store processed data or data to be processed in accordance with the invention. The system 900 may also include a display controller 909 for providing an interface to a display device 911, which may be a cathode ray tube (CRT), a thin film transistor (TFT) display, organic light-emitting diode, electroluminescent panel, plasma panel, or other type of display. The computing system 900 may also include one or more peripheral controllers or interfaces 905 for one or more peripherals 906. Examples of peripherals may include one or more printers, scanners, input devices, output devices, sensors, and the like. A communications controller 914 may interface with one or more communication devices 915, which enables the system 900 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for text classification using one or more processors to cause steps to be performed comprising:
generating a set of skip-gram sequences comprising at least one skip-gram sequence having non-consecutive tokens from a text input comprising one or more words and having an associated ground-truth class label;
converting each skip-gram sequence into corresponding word vectors;
generating, by a skip-gram convolution module, individual skip-gram feature maps respectively for each skip-gram sequence based on at least word vectors for each skip-gram sequence, the individual skip-gram feature maps are grouped according to start positions and total skip sizes of corresponding skip-gram sequences;
performing max pooling on each group of individual skip-gram feature maps to generate a representative feature map for the group;
generating, at a recurrent module, one or more hidden states using the representative feature maps for each group;
generating, using a softmax layer, a probability distribution of classes for the text input based on the one or more hidden states; and
computing a loss based upon the associated ground-truth class label and the probability distribution of classes to update parameters for at least one skip-gram convolution module and the recurrent module.

2. The computer-implemented method of claim 1 wherein each skip-gram sequence in the set of skip-gram sequences has the same gram size and a total skip size no greater than a predetermined number.

3. The computer-implemented method of claim 1 wherein skip-gram sequences in the set of skip-gram sequences have different gram sizes.

4. The computer-implemented method of claim 1 wherein the recurrent module is a single recurrent neural network (RNN), and the single RNN generates a hidden states using the representative feature maps for each group with steps comprising:
concatenating representative feature maps for each group into an input vector; and
generating the hidden state at the single RNN based on the input vector, the hidden state is the last hidden state of the single RNN.

5. The computer-implemented method of claim 1 wherein the recurrent module comprises multiple recurrent neural networks (RNNs), and the multiple RNNs respectively generate multiple hidden states using the representative feature maps for each group with steps comprising:
respectively concatenating representative feature maps for each skip size a concatenated individual vector;
feeding each concatenated individual vector to a corresponding RNN of the multiple RNNs; and
generating, at each corresponding RNN, a last hidden state based on the concatenated individual vector.

6. The computer-implemented method of claim 5 wherein generating the probability distribution of classes for the text input based on the one or more hidden states comprises:
concatenating the last hidden states of the multiple RNNs as a merged vector; and
generating, using the softmax layer, the probability distribution of classes for the text input with the merged vector.

7. The computer-implemented method of claim 5 wherein the multiple RNNs do not sharing parameters.

8. The computer-implemented method of claim 1 wherein generating, by the skip-gram convolution module, individual skip-gram feature maps respectively for each skip-gram sequence comprises:
for each position in the skip-gram sequence, constructing a skip-gram window matrix comprising word vectors for a plurality of grams, the number of grams equals to the length of the skip-gram sequence; and
convolving a plurality of filters with the window matrix at each position to generate a feature map at each position.

9. The computer-implemented method of claim 8 wherein convolving the plurality of filters with the window matrix at each position is implemented by a nonlinear transformation for a skip-gram convolution operation between the window matrix at each position and each of the plurality of filters.

10. A computer-implemented method for text classification using one or more processors that cause steps to be performed comprising:
generating a set of skip-gram sequences comprising at least one skip-gram sequence having non-consecutive tokens from a text input comprising a set of words;
generating, by a skip-gram convolution module, individual skip-gram feature maps respectively for each skip-gram sequence based on at least word vectors for each skip-gram sequence, the individual skip-gram feature maps are grouped according to start positions and total skip sizes of corresponding skip-gram sequences;
performing max pooling on each group of individual skip-gram feature maps to generate a representative feature map for the group;
concatenating representative feature maps for each group into an input vector;
generating, using a recurrent neural network (RNN), a final hidden state based on the input vector; and
generating, using a softmax layer, a class probability distribution of the text input based on the one or more hidden states for text classification determination.

11. The computer-implemented method of claim 10 wherein each skip-gram sequence in the set of skip-gram sequences has the same gram size and a total skip size no greater than a predetermined number.

12. The computer-implemented method of claim 10 further comprising assigning a text classification to the text input using the class probability distribution.

13. The computer-implemented method of claim 10 wherein generating, by the skip-gram convolution module, individual skip-gram feature maps respectively for each skip-gram sequence comprises:
for each position in the skip-gram sequence, constructing a skip-gram window matrix comprising word vectors for a plurality of grams, the number of grams equals to the length of the skip-gram sequence; and
convolving a plurality of filters with the window matrix at each position to generate a feature map at each position.

14. The computer-implemented method of claim 13 wherein convolving the plurality of filters with the window matrix at each position is implemented by a nonlinear transformation for a skip-gram convolution operation between the window matrix at each position and each of the plurality of filters.

15. A computer-implemented method for text classification using one or more processors that cause steps to be performed comprising:
generating a set of skip-gram sequences comprising at least one skip-gram sequence having non-consecutive tokens from a text input comprising a set of words;
generating, by a skip-gram convolution module, individual skip-gram feature maps respectively for each skip-gram sequence based on at least word vectors for each skip-gram sequence, the individual skip-gram feature maps are grouped according to start positions and total skip sizes of corresponding skip-gram sequences;
performing max pooling on each group of individual skip-gram feature maps to generate a representative feature map for the group;
respectively concatenating representative feature maps for each skip size into a concatenated individual vector;
feeding each concatenated individual vector to a corresponding recurrent neural network (RNN) of multiple RNNs;
generating, at each corresponding RNN, a last hidden state based on the concatenated individual vector; and
generating, using a softmax layer, a class probability distribution of the text input based on the last hidden state of each corresponding RNN for text classification determination.

16. The computer-implemented method of claim 15 wherein generating the class probability distribution comprises:
concatenating the last hidden states of each corresponding RNN as a merged vector; and
generating the probability distribution of classes for the text input using the merged vector.

17. The computer-implemented method of claim 15 further comprising assigning a classification to the text input using the class probability distribution.

18. The computer-implemented method of claim 15 wherein the multiple RNNs do not sharing parameters.

19. The computer-implemented method of claim 15 wherein generating, by the skip-gram convolution module, individual skip-gram feature maps respectively for each skip-gram sequence comprises:
for each position in the skip-gram sequence, constructing a skip-gram window matrix comprising word vectors for a plurality of grams, the number of grams equals to the length of the skip-gram sequence; and
convolving a plurality of filters with the window matrix at each position to generate a feature map at each position.

20. The computer-implemented method of claim 19 wherein convolving the plurality of filters with the window matrix at each position is implemented by a nonlinear transformation for a skip-gram convolution operation between the window matrix at each position and each of the plurality of filters.

* * * * *